Nov. 21, 1950     S. MANDL ET AL     2,530,887
AXIALLY ENGAGING POSITIVE CLUTCH
Filed April 26, 1945     2 Sheets-Sheet 1
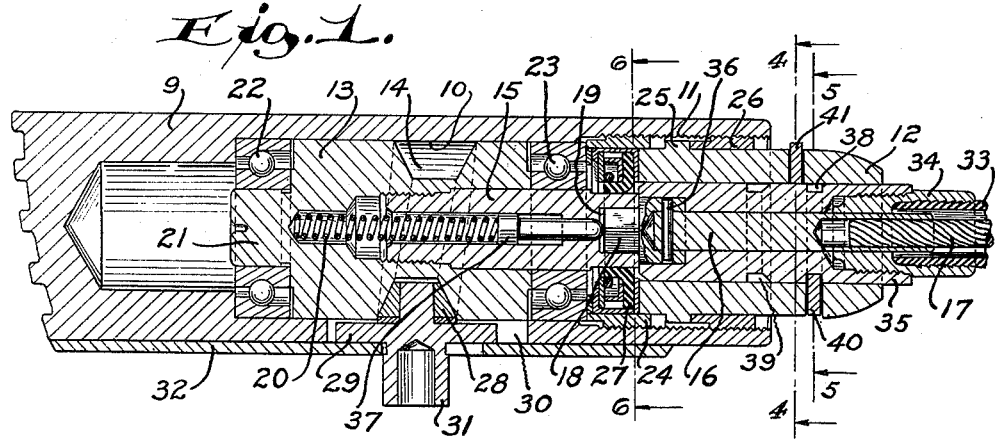
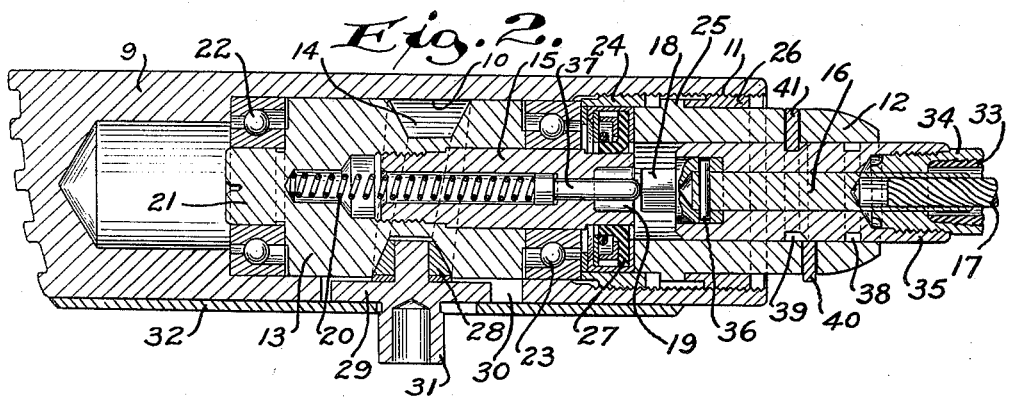
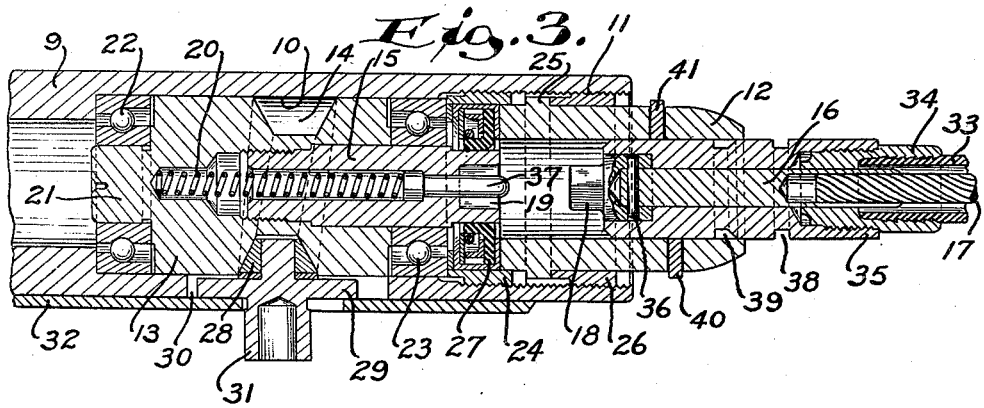
INVENTORS
S. Mandl
BY E. M. Pfauser
Lieber & Lieber
ATTORNEYS Nov. 21, 1950   S. MANDL ET AL   2,530,887
AXIALLY ENGAGING POSITIVE CLUTCH
Filed April 26, 1945   2 Sheets-Sheet 2
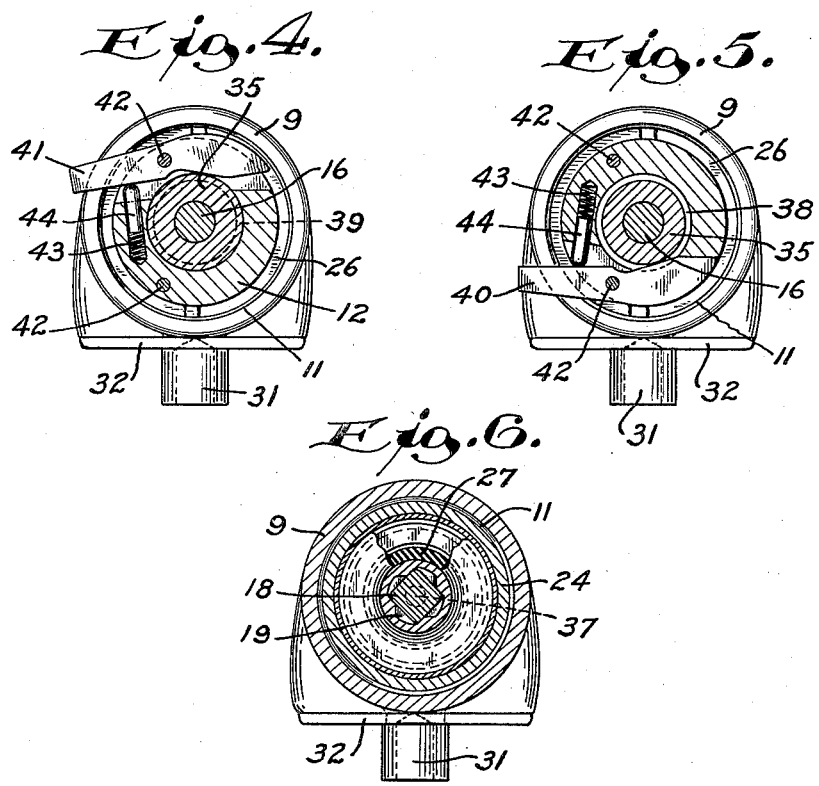
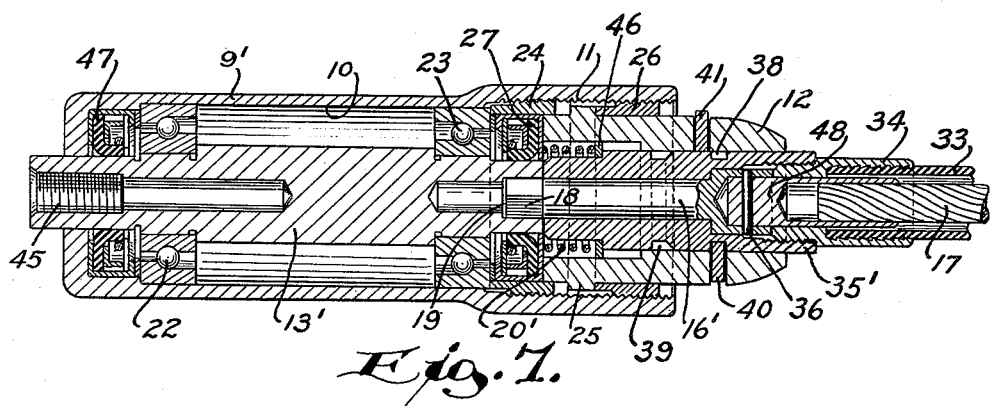

Patented Nov. 21, 1950

2,530,887

UNITED STATES PATENT OFFICE 2,530,887

AXIALLY ENGAGING POSITIVE CLUTCH

Siegmund Mandl, Milwaukee, and Edward M. Pfauser, Elm Grove, Wis., assignors to Blackhawk Mfg. Co., Milwaukee, Wis., a corporation of Wisconsin Application April 26, 1945, Serial No. 590,381

16 Claims. (Cl. 192—67)

The present invention relates generally to improvements in the art of transmitting motion from one element to another, and relates more specifically to various improvements in the construction and operation of mechanism for effecting controllable transmission of rotary motion from a driving to a driven member.

The primary object of our invention is to provide an improved rotary motion transmitter which is simple and compact in construction, and which is also highly efficient in use and flexible in its adaptations.

Some of the more important specific objects of the invention are as follows:

To provide a portable universally movable rotary motion transmitting mechanism adapted to be conveniently operated in any desired position and in cramped quarters if necessary, so as to effectively transmit considerable power from diverse driving sources to a variety of tools or implements.

To provide a sturdy and compact manually manipulable rotary drive which may be readily utilized to interchangeably cooperate with a great number of different rotary, reciprocating, oscillating, vibrating, or impact actuated devices used to effect numerous operations such as sanding, polishing, filing, sawing, vibrating, carving, cutting, scrubbing, scraping, drilling, digging, chipping, bumping, riveting, driving, revolving, and the like.

To provide a small but powerful rotary driving assemblage which is operable at relatively high speeds derived from various sources of power, and which is easily and safely manipulable and controllable by a novice to perform an extended variety of classes or types of work.

To provide an improved rotary motion transmitter having high efficiency and which is especially adapted to be interposed directly between the power delivery end of a flexible rotating shaft and a variety of reciprocable, rotatable, or impact actuated hand controlled implements or tools, without annoying or endangering the operator.

To provide a durable rotary motion transmitting device which may be quickly and conveniently assembled or dismantled, and which may also be readily lubricated and maintained in operating condition at all times.

To provide a simplified motion and power transmitting assembly the various parts of which may be constructed with the aid of ordinary machinery, and which may be manufactured in various sizes at moderate cost.

These and other specific objects and advantages of the invention will be apparent from the following detailed description.

A clear conception of the several features constituting our present improvement, and of the mode of constructing and of manipulating several types of the improved motion transmitters, may be had by referring to the drawings accompanying and forming a part of this specification wherein like reference characters designate the same or similar parts in the various views.

Fig. 1 is a central longitudinal section through one type of the rotary motion transmitter which is also adapted to convert the rotary into reciprocating motion, showing the parts in fully assembled and driving position;

Fig. 2 is a similar section through the same transmitter, showing the driving connection interrupted but with the driving member still attached to the transmitter casing and ready for re-connection with the driven member;

Fig. 3 is another similar section through the motion transmitter of Figs. 1 and 2, but showing the driving member substantially detached from the transmitter casing and fully disconnected from the driven member;

Fig. 4 is a transverse section taken through the active assembly of Fig. 1, along the line 4—4 and showing the auxiliary or stop latch in inactive position;

Fig. 5 is another transverse section through the assemblage of Fig. 1, taken along the line 5—5, and showing the main or power control latch in active position;

Fig. 6 is still another transverse section taken through the transmitting assembly of Fig. 1, along the line 6—6 and showing the releasable driving connection between the driving and driven members; and Fig. 7 is a central longitudinal section through another type of the improved rotary motion transmitter adapted to transmit rotary motion directly from a power source to an implement or tool.

While the invention has been shown and described herein as being especially adapted for use in a portable transmitter operable at high speed by an electric motor through a flexible shaft, it is not our desire to unnecessarily restrict the utility of the improvement by virtue of this limited disclosure, since some of the improved features are more generally applicable to portable units driven by fluid pressure actuated motors, and to assemblages wherein the motors are mounted upon the unit.

Referring to Figs. 1 to 6 inclusive of the drawings, the improved rotary motion transmitting assemblage shown therein, comprises in general a portable main casing 9 having therein a bore 10 one end of which is provided with internal screw threads 11 and is closed by a tubular plug 12 disposed coaxially of the bore 10; a driven element or member 13 journalled for rotation within the casing bore 10 and having a medial cam groove 14 and a rigid axial sleeve 15 projecting centrally toward the plug 12; a driving element or member 16 journalled for rotation by means of a flexible drive shaft 17, within the plug 12 and having a polygonal end projection 18 adapted to be inserted within an end recess or socket 19 formed in the sleeve 15 to provide a driving connection between the driving and driven members 16, 13; resilient means such as a compression spring 20 coacting with the driven member 13 and with the projection 18 out of the socket 19; and latch means carried by the casing plug 12 for establishing the driving connection and for facilitating removal of the driving member 16 from the plug 12.

The exterior of the main casing 9 may assume any suitable shape and may if desired, be provided with a manipulating handle in order to permit convenient disposition thereof in various positions; and the rotary driven member 13 is provided with an integral end extension 21 of approximately the same diameter as that of the sleeve 15 and is rotatably supported within the casing bore 10 by means of combined guide and thrust bearings 22, 23. These bearings 22, 23 are preferably of an anti-friction type having inner and outer races coacting respectively with the sleeve 15 and extension 21 and with the bore 10, and while the bearings 22, 23 should permit free rotation of the driven member 13 they should also be confined so as to positively prevent axial or longitudinal displacement thereof. The bearings 22, 23 are therefore held in spaced relation relative to each other by the enlarged medial portion of the rotary driven member 13, and a threaded bushing 24 coacts with the internal casing threads 11 and with the outer race of the bearing 23 so as to prevent separation of the bearings and axial displacement of the member 13.

The threaded bushing 24 is engaged by a peripheral flange 25 formed on the hollow closure plug 12, and this flange 25 is engaged by a second threaded bushing 26 snugly embracing the plug 12 and which also coacts with the internal casing threads 11, thereby locking the bushing 24 in place. An annular packing assemblage 27 is snugly confined within the bushing 24 and between the bearing 23 and the inner end of the plug 12, and snugly embraces the socketed end of the sleeve 15 thus sealing the portion of the bore 10 in which the member 13 and bearings 22, 23 are confined. The bushings 24, 26 have end notches adapted to be engaged by a spanner wrench in order to effect insertion and removal thereof; and the plug 12, packing assemblage 27, annular bearing 23, driven member 13, and annular bearing 22 may obviously be withdrawn from the casing bore 10 in succession, upon removal of the threaded bushings 24, 26.

The medial cam groove 14 of the driven member 13 is annular but lies in a plane which is inclined relative to the central axis of the bore 10, and a tapered roller 28 which is journalled for rotation upon a reciprocable power take-off element 29, snugly coacts with the groove 14.

The element 29 is guided for reciprocation within a slot 30 formed in the casing 9 adjacent to the bore 10, and has an integral external projection 31 adapted to impart reciprocation to various types of reciprocable tools and implements, in an obvious manner. With this assemblage of parts, the rotary motion of the driven member 13 is directly and effectively converted into reciprocating motion of the element 29 while the member 13 is fixed against axial displacement by the bearings 22, 23; and the slot 30 may normally be sealed by a removable plate 32 attached to the casing 9, or otherwise, in order to permit lubricant such as oil or grease to be confined within the casing bore 10, groove 14, bearings 22, 23, and slot 30.

The flexible drive shaft 17 which may be rotated at high or low speed from an electric motor or the like, is housed within a flexible tubular casing 33 which is firmly secured to a threaded fitting 34 screw threaded into an outer end socket of a bearing element or sleeve 35 in which the driving member 16 is journalled, and the flexible shaft 17 and confining casing 33 may be of any desired length in order to permit the motion transmitter unit to be moved about freely throughout a considerable range. The power delivery end of the flexible shaft 17 is sweated or otherwise firmly secured to the rotary driving member 16 which is snugly fitted within a central bore of the bearing element or sleeve 35, and the inner end of the member 16 terminates in a circular central recess formed in the inner end of the sleeve 35. The polygonal motion transmitting projection 18 is provided with a pocket which snugly engages the motion delivery end of the member 16 and is normally rigidly attached thereto by a shear pin 36, and this pin 36 is adapted to break or to be severed in case excessive resisting force is applied to the projection 18. The driving member 16 is thus freely rotatable within the sleeve 35, and the polygonal projection 18 is normally rigidly attached thereto for driving purposes.

As shown in Fig. 6, the polygonal driving projection 18 has a square transverse cross-section, while the socket recess 19 formed in the central sleeve 15 of the driven member 13 has a cross-shaped transverse cross-section and is adapted to loosely receive the projection 18. This formation of the driving connection is important, especially when transmitting rotary motion at high speed, since it permits the projection 18 to readily and quickly enter the socket 19 when the former is moved or shifted axially toward the latter. The compression spring 20 is confined within coaxial central bores formed in the driven member 13 and sleeve 15, and one end of this spring 20 coacts directly with the member 13 while its opposite end presses against a plunger 37 slidably mounted within the sleeve 15 and adapted to engage the end of the polygonal driving projection 18. When the projection 18 is thus engaged by the plunger 37, the spring 20 tends to push the driving projection out of the socket recess 19, but the projection 18 may be readily inserted within the recess 19 in opposition to the spring pressure by merely grasping the flexible shaft casing 33 and fitting 34 and by thereafter sliding the bearing sleeve 35 within the plug 12 toward the driven member 13.

Obviously, unless means are provided for preventing the spring 20 from pushing the projection 18 out of the socket recess 19 when the driving and driven members 16, 13 have been thus drivingly interconnected, no driving connection will be maintained; and we have therefore provided improved latch means for maintaining a proper driving connection and for also facilitating removal of the transmitter unit from the power source. For these purposes, the bearing sleeve 35 of the driving member 16 is provided with two laterally spaced peripheral annular grooves 38, 39 and the casing plug 12 has two latches 40, 41 swingably suspended therefrom, see Figs. 1 to 5 inclusive. The latches 40, 41 are disposed on opposite sides of the plug 12 and are spaced apart a lesser distance than the grooves 38, 39 so that both latches cannot simultaneously engage both grooves. Each latch 40, 41 is swingably suspended from the plug 12 by a pivot pin 42, and has its inner latching end urged toward the bearing sleeve 35 by means of a spring 43 and a plunger 44.

With this improved latch assembly, as soon as the driving projection 18 has been properly inserted within the socket recess 19 as in Fig. 1, the main latch 40 will be snapped into the annular recess 38 as shown in Figs. 1 and 5, thereby maintaining the driving connection between the driving member 16 and the driven member 13 in opposition to the compressed spring 20. Rotation of the flexible shaft 17 will then be transmitted through the driving member 16, projection 18, socket recess 19, and sleeve 15 to the rotary driven member 13, and rotation of this member will be converted into constant reciprocation of the element 29 by the roller 28 coacting with the cam groove 14 of the member 13.

If it becomes desirable to disconnect the driven member 13 from the driving member 16, it is only necessary for the operator to release the main latch 40, thereby permitting the spring 20 to become effective to quickly push the driving projection 18 out of the socket 19 as shown in Fig. 2. During this axial displacement of the projection 18 and of the driving member 16, the bearing sleeve 35 will be shifted axially within the plug 12 until the auxiliary latch 41 snaps into the second groove 39 of the sleeve 35, thereby arresting the motion of this sleeve and preventing it from leaving the bore of the casing plug 12. In order to thereafter re-connect the driving and driven members 16, 13 it is only necessary to push the sleeve 35 inwardly toward the driven member 13 without necessarily releasing the auxiliary latch 41, since the inclined side of the groove 39 with which this latch coacted will automatically release the same when inward axial pressure is applied. The drive may thus be readily connected or disconnected by the operator, without danger of having the sleeve 35 forced out of the casing plug 12 by the spring 20.

When it becomes desirable to remove the casing 9, plug 12 and driven member 13 from the driving shaft 17, the operator need merely release both latches 40, 41 and slide the bearing sleeve 35 within the plug 12 away from the driven member 13 as depicted in Fig. 3. After the grooves 38, 39 have been pulled outwardly beyond the latches 40, 41, the parts may obviously be readily separated without further manipulating the latches. Reassembly of the separated parts may be just as conveniently effected by merely pressing both latch handles and by thereafter slipping the sleeve 35 into the closure plug 12 as in Fig. 2.

While the improved motion transmitting unit shown in detail in Figs. 1 to 6 inclusive is adapted to also convert the rotary motion of the driven member into reciprocating motion, this particular feature constitutes no part of our present invention which is also applicable to a transmitter for rotary motion only. Such a rotary motion transmitting unit is shown in Fig. 7 wherein some parts are somewhat modified, but in which the normal operation is precisely the same as hereinbefore described. This modified portable rotary motion transmitter comprises in general a tubular main casing 9' having a central bore 10 one end of which is provided with internal screw threads 11 and is normally closed by a hollow plug 12; spaced anti-friction bearings 22, 23 mounted within the casing bore 10; a rotary driven element or member 13' journalled for rotation within the bearings 22, 23 and having a central screw threaded tool receiving socket 45 at one end and a central driving socket or recess 19 at its opposite end; a rotary driving element or member 16' journalled for rotation by means of a flexible drive shaft 17, within the plug 12 and having an integral polygonal end projection 18 drivingly cooperable with the driving recess 19 of the driven member 13'; a resilient compression spring 20' tending to constantly separate the members 16', 13' and to push the projection 18 out of the recess 19; and latches 40, 41 carried by the plug 12 for establishing a driving connection between the members 16', 13' and for facilitating removal of the transmitter unit from the driving source.

In the modified assemblage, the casing closure plug 12 is bored to slidably receive a bearing sleeve 35' in which the driving member 16' is rotatably confined and directly journalled, and the plug 12 is normally held in place by threaded bushings 24, 26 coacting with the internal casing threads 11, one of these bushings also serving to prevent spreading of the bearings 22, 23. The sleeve 35' is likewise provided with annular recesses 38, 39 with which the latches 40, 41 carried by the plug 12 are cooperable in the same manner as previously described, and an annular packing or sealing assemblage 27 is again provided within the bushing 24 and between the bearing 23 and the inner end of the closure plug 12. However, an additional packing or sealing assemblage 47 similar to the assemblage 27, is also provided at the opposite end of the driven member 13' around the tool receiving socket 45, in order to insure tight closure of the anti-friction bearing confining chamber.

The disconnecting spring 20' of the modified rotary motion transmitter is of relatively large diameter and is interposed between the packing assemblage 27 and a washer 46 coacting with an abutment formed on the bearing sleeve 35', and the driving member 16' has the polygonal projection 18 formed integral with one end thereof while its opposite end is socketed for the reception of an intermediate connecting element 48 which is firmly secured as by sweating, to the flexible drive shaft 17. A shear pin 36 is interposed between the end of the element 48 and its confining socket, for safety sake, and this pin 36 is readily replaceable by merely releasing the fitting 34 from the bearing sleeve 35' and by thereafter removing the driving member 16' axially from within the bearing sleeve.

As previously indicated, the modified rotary motion transmitter operates and functions the same as the unit which has previously been described in detail, and a large variety of different rotary tools may obviously be applied to the threaded socket 45, while the casing 9' may again be moved about freely and disposed in any desired position, by the operator. The casing 9' may be filled with suitable lubricant and the anti-friction bearing confining chamber is thoroughly sealed against possible escape of lubricant by the packing assemblages 27, 47, while all of the normally concealed parts are freely removable upon withdrawal of the bushings 26, 24 and of the closure plug 12. The main latch 40 of the modified assemblage functions to maintain the driving connection between the driving member 16' and the driven member 13' in opposition to the pressure exerted by the spring 20', and in the modification this spring is stationary and does not rotate with the driving and driven members. The auxiliary latch 41 serves as a stop for the bearing sleeve 12 and member 16' during interruption of the power connection, and the casing assembly and driven member 13' are readily removable from the power source by merely releasing both of the latches 40, 41.

From the foregoing detailed description it will be apparent that our present invention provides an improved rotary motion transmitter which besides being extremely simple and compact in construction, is also highly efficient in use and flexible in its adaptations. The improved rotary motion transmitting mechanism is obviously adapted to be conveniently operated in any desired position and in cramped quarters to effectively drive numerous different types of tools for performing various operations. The improved transmitting unit is exceptionally powerful and is readily manipulable, and the improved latches 40, 41 besides enabling convenient control of the power transmission and complete release of the transmitter from the power source, also permits the transmitting unit to be revolved about the driving member and its bearing sleeve so as to permit convenient actuation of the latches either from the right or left sides or from the top or bottom of the assemblage. The provision of the annular grooves 38, 39 with which the latches 40, 41 are adapted to coact, is also important since these grooves permit the power unit to be revolved freely about its longitudinal axis while in use, while also enabling the latches to become effective regardless of the relative position of the unit and its sleeve 35. When the sleeve 35' has been removed from the portable unit the socket 19 may also be utilized to facilitate the interchangeable attachment of tools to the socket 45, by inserting a screw driver or the like into the socket and thus preventing free rotation of the member 13'.

The rotary motion transmitter is adapted to be actuated directly from a high speed motor and has actually been operated in a highly successful manner at speeds exceeding three thousand revolutions without introducing objectionable vibration or other annoyances. It should also be noted that the casing assemblage comprises essentially the casing body 9 and the plug 12, but these parts need not be formed of separate pieces but may obviously be made in one piece, and the same is true of the driven member 13 and its sleeve 15, which have in fact been shown formed integral with each other in the modification of Fig. 7. In each case the various parts of the improved assemblage may be effectively lubricated and are amply protected against damage at all times while still being conveniently accessible, manipulable, and controllable, and the simplicity of the structure makes it possible to manufacture the same with ordinary machinery and at exceedingly moderate cost.

It should be understood that it is not desired to limit this invention to the exact details of construction or to the precise mode of operation, herein shown and described, for various modifications within the scope of the appended claims may occur to persons skilled in the art.

We claim:

1. In a rotary motion transmitter, a casing having a bore internally threaded at one end, a tubular plug extending into said threaded bore end, a driven member journalled for rotation within said bore inwardly beyond said threaded end, a ring nut coacting with said threaded end to prevent axial displacement of said driven member, a packing coacting with said driven member adjacent to said ring nut, another ring nut coacting with said threaded end and with said plug for urging the latter against said packing, a driving member journalled for rotation within said plug, and means for drivingly connecting said members within said casing.

2. In a rotary motion transmitter, a casing having a bore and being internally threaded at one end, a centrally bored plug extending into said threaded casing end, a driven member rotatable within said casing bore beyond the inner end of said plug, a ring nut coacting with said threaded casing end to prevent axial displacement of said driven member, another ring nut coacting with said plug and with said threaded casing end to prevent axial displacement of the plug, a driving member journalled for rotation within said plug, means for drivingly connecting said members within said casing, and means carried by said plug for actuating said connecting means.

3. In a rotary motion transmitter, a casing, driving and driven members journalled for rotation relative to said casing, one of said members having a recess and the other having a projection movable into said recess to establish a driving connection between said members, and one member also having an abutment thereon, means constantly tending to urge said projection out of driving contact with said recess, a bearing element supporting said driving member and being cooperable with said abutment to shift said member toward the driven member, a latch cooperable with said casing and with said bearing element to hold said projection in driving engagement with said recess, and a second latch cooperable with said casing and with said element to prevent said driving member from being forced out of said casing when said first mentioned latch is released, said driving member being freely removable from said casing when said second latch is released.

4. In a rotary motion transmitter, a casing, axially alined driving and driven members journalled for rotation within said casing, one of said members having an end recess and the other having an end projection insertible within said recess to establish a driving connection between said members, and one member also having an abutment thereon, resilient means constantly tending to urge said projection out of driving engagement with said recess, a bearing element supporting said driving member and being cooperable with said abutment and movable to shift said member axially toward the driven member, a latch carried by said casing and being cooperable with said bearing element to hold said projection in driving contact with said recess, and a second latch carried by said casing and also being cooperable with said element to stop and to prevent said driving member from being pushed out of said casing by said resilient means when said first mentioned latch is released, said element and said driving member being freely axially removable from said casing when said second latch is released.

5. In a rotary motion transmitter, a casing, axially alined driving and driven members rotatable within said casing, one of said members having a central end recess and the other having a central polygonal end projection movable into said recess to drivingly connect said members, one of said members also having an abutment surface thereon, a spring tending to constantly urge said projection out of driving engagement with said recess, a bearing sleeve disposed within an end of said casing and being cooperable with said surface and shiftable to counteract said spring while rotatably supporting said driving member, a drive maintaining latch cooperable with said casing and with said sleeve to hold said projection in driving cooperation with said recess in opposition to said spring, and a second latch cooperable with said casing and with said sleeve to stop and to prevent the latter from being forced out of said casing by said spring when said drive maintaining latch is released, said driving member and sleeve being freely axially removable from said casing when said second latch is released.

6. In a rotary motion transmitter, a casing, axially alined driving and driven members rotatable within said casing, said driving member having a central polygonal end projection provided with an abutment and said driven member having a central end recess drivingly cooperable with said projection, a spring constantly tending to axially separate said members and to urge said projection out of driving engagement with said recess, a bearing sleeve for said driving member having a surface cooperable with said abutment and being movable along the member axis to counteract said spring and extending into an end of said casing, said sleeve having therein spaced annular grooves, a latch carried by said casing and being cooperable with one of said grooves to maintain a driving connection between said projection and said recess, and a stop latch carried by said casing and being cooperable with the other of said grooves to prevent the driving member from being forced out of said casing by said spring when said first mentioned latch is released, said driving member and said sleeve being freely axially removable from said casing when said latches are released.

7. In a rotary motion transmitter, a casing having a bore and a hollow plug normally closing an end of said bore, a driven member journalled for rotation centrally within said bore, a driving member journalled for rotation centrally of said hollow plug, one of said members having an end recess and the other having an end projection drivingly cooperable with said recess, and one member also having an abutment thereon, means constantly tending to separate said members so as to interrupt the driving connection afforded by said recess and projection, a bearing element supporting said driving member and coacting with said abutment to move said member toward the driven member, a main latch coacting with said element to maintain said driving connection, and an auxiliary latch for preventing said driving member from being forced out of said casing when said main latch is released, said driving member being removable from said hollow plug when both latches have been released.

8. In a rotary motion transmitter, a casing having a bore and a hollow plug normally closing an end of said bore, a driven member journalled for rotation centrally within said bore, a driving member journalled for rotation centrally of said closure plug, said driven member having an end recess and said driving member having a polygonal end projection provided with an abutment and drivingly cooperable with said recess, resilient means constantly tending to shift said driving member so as to interrupt the driving connection afforded by said recess and projection, a bearing sleeve for supporting said driving member located centrally within said plug and being cooperable with said abutment and axially movable to counteract said resilient means, a main latch cooperable with said sleeve to maintain said driving connection, and an auxiliary latch cooperable with said sleeve to prevent said driving member from being forced out of said plug when said main latch is released, said driving member and said sleeve being freely axially removable from said plug when both of said latches are released.

9. In a rotary motion transmitter, a hollow casing having a removable tubular closure plug at one end, a bearing sleeve slidable axially within said plug, a pair of spaced bearings mounted within said casing, a driven member journalled for rotation within said bearings and cooperating with said plug to maintain the bearings in fixed spaced relation, a driving member journalled for rotation within said sleeve and having an abutment cooperable with said sleeve to cause the latter to axially shift the driving member toward said driven member, the adjacent ends of said members being formed to provide a releasable driving connection, means constantly tending to separate said members so as to interrupt said connection, and latch means for maintaining said sleeve within said plug, said driving member being removable from said plug when said latch means are released and both of said members being removable from said casing when said closure plug is removed.

10. In a rotary motion transmitter, a hollow casing having a removable tubular closure plug at one end, a pair of spaced bearings mounted within said casing, a driven member journalled for rotation within said bearings and cooperating with said plug to maintain the bearings in fixed spaced relation, a bearing sleeve slidably mounted within said closure plug and having a transverse surface, a driving member journalled for rotation within said sleeve and having thereon an abutment engageable with said surface and being axially movable by the sleeve toward said driven member, the adjacent ends of said members being formed to provide a releasable driving connection, means constantly tending to separate said members so as to interrupt said connection, a main latch coacting with said sleeve to maintain said driving connection against the action of said drive interrupting means, and an auxiliary latch also coacting with said sleeve to prevent said driving member from being forced out of said plug by said drive interrupting means, said driving member and sleeve being axially removable from said plug when both latches are released.

11. In a rotary motion transmitter, a portable casing adapted to be carried in the hands of an operator, a driven member journalled for rotation within said casing and being fixed against axial displacement, a bearing sleeve slidably confined within said casing and having a transverse surface, an axially shiftable driving member having an abutment cooperable with said surface and being rotatably confined within said sleeve in axial alinement with said driven member, the adjacent ends of said members being formed to provide a driving connection, a flexible driving shaft directly attached to said driving member, resilient means constantly tending to iterrupt said driving connection, and a manually manipulable latch associated with said casing for releasably maintaining said driving connection in opposition to said resilient means, said sleeve coacting with said driving member in a manner whereby sliding of the sleeve in one direction will establish said driving connection.

12. In a rotary motion transmitter, a portable casing adapted to be carried in the hands of an operator, a driven member journalled for rotation within said casing and being fixed against axial displacement, a bearing sleeve slidable axially within said casing and having a transverse surface, an axially shiftable driving member having an abutment cooperable with said surface and being journalled in said sleeve in axial alinement with said driven member, a flexible driving shaft attached to said driving member, one of said members having a square end projection loosely insertible within a cross-shaped socket in the adjacent end of the other to provide a releasable driving connection between the members, resilient means within said casing constantly tending to interrupt said driving connection, and latch means associated with said sleeve for maintaining said driving connection at will in opposition to the action of said resilient means, said sleeve surface coacting with said driving member abutment in a manner whereby sliding of the sleeve toward said driving member will establish said driving connection.

13. In a rotary motion transmitter, a casing, axially alined driving and driven members rotatable within said casing, one of said members having a central polygonal end projection and the other of said members having a central end recess drivingly cooperable with said projection, and one member also having an abutment thereon, means tending to constantly separate said members and to urge said projection out of driving engagement with said recess, a bearing sleeve for said driving member extending into an end of said casing and having therein spaced annular grooves and also having a transverse surface thereon, and latches carried by said casing and being cooperable with said grooves to maintain a driving connection between said projection and said recess and to also prevent the driving member from being forced out of said casing when said driving connection is interrupted, said bearing sleeve being rotatable relative to said latches and the latter being cooperable with said grooves in any position of said relative rotation and the sleeve surface also being cooperable with said driving member abutment and shiftable toward said driven member to establish said driving connection.

14. In a rotary motion transmitter, a casing having a bore and being internally threaded at one end, a centrally bored plug extending into said threaded casing end, a driven member rotatable within said casing bore beyond the inner end of said plug, a ring nut coacting with said threaded casing end to prevent axial displacement of said driven member, another ring nut coacting with said plug and with said threaded casing end to prevent axial displacement of the plug, a bearing sleeve slidable within said plug bore and having a transverse surface, a driving member having an abutment cooperable with said surface and being rotatable within and movable by said bearing sleeve, and means cooperable with said sleeve and with said plug to maintain a driving connection between said members.

15. In a rotary motion transmitter, a casing having a bore, a centrally bored removable plug normally closing one end of said casing bore, a driven member journalled for rotation within said casing bore, a bearing sleeve slidable within said plug bore and having a transverse surface, a driving member having an abutment cooperable with said surface and being rotatable within said bearing sleeve and axially movable thereby toward said driven members to establish a driving connection between the members, and a latch carried by said plug and coacting with said sleeve to maintain said driving connection.

16. In a rotary motion transmitter, a casing having a bore, a centrally bored removable plug normally closing one end of said casing bore, a driven member journalled for rotation within said casing bore, a bearing sleeve slidable within said plug bore and having a transverse surface, a driving member having an abutment cooperable with said surface and being rotatable within said bearing sleeve and axially movable thereby toward said driven member to establish a driving connection between the members, a latch carried by said plug and coacting with said sleeve to maintain said driving connection, means for disconnecting said members when said latch is released, and another latch cooperable with said sleeve to retain the latter within said plug when said members are disconnected.

SIEGMUND MANDL.
EDWARD M. PFAUSER.

REFERENCES CITED

The following references are of record in the file of this patent:

UNITED STATES PATENTS

| Number | Name | Date |
| --- | --- | --- |
| 558,661 | Richards | Apr. 21, 1896 |
| 1,355,659 | Evslin | Oct. 12, 1920 |
| 1,503,723 | Strom | Aug. 5, 1924 |
| 1,698,952 | Hoover | Jan. 15, 1929 |
| 2,144,269 | Peltz | Jan. 17, 1939 |